(12) United States Patent
Bu et al.

(10) Patent No.: US 12,548,828 B2
(45) Date of Patent: Feb. 10, 2026

(54) SECONDARY BATTERY

(71) Applicant: Contemporary Amperex Technology Co., Limited, Ningde (CN)

(72) Inventors: Xiangyan Bu, Ningde (CN); Qingkui Chi, Ningde (CN); Peng Wang, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 649 days.

(21) Appl. No.: 17/471,205

(22) Filed: Sep. 10, 2021

(65) Prior Publication Data

US 2021/0408625 A1    Dec. 30, 2021

Related U.S. Application Data

(63) Continuation of application No. PCT/CN2020/108202, filed on Aug. 10, 2020.

(30) Foreign Application Priority Data

Aug. 14, 2019   (CN) .......................... 201910749967.2

(51) Int. Cl.
*H01M 50/15* (2021.01)
*H01M 50/103* (2021.01)
(Continued)

(52) U.S. Cl.
CPC ......... *H01M 50/15* (2021.01); *H01M 50/103* (2021.01); *H01M 50/317* (2021.01);
(Continued)

(58) Field of Classification Search
CPC .. H01M 50/15; H01M 50/533; H01M 50/543; H01M 50/103; H01M 50/317; H01M 2200/00
See application file for complete search history.

(56) References Cited

U.S. PATENT DOCUMENTS

| 6,204,635 | B1 | 3/2001 | Sullivan |
| 2006/0024568 | A1 | 2/2006 | Lee |

(Continued)

FOREIGN PATENT DOCUMENTS

| CN | 102088103 A | 6/2011 |
| CN | 102447128 A | 5/2012 |

(Continued)

OTHER PUBLICATIONS

The First Office Action for China Application No. 201910749967.2, dated Mar. 1, 2021, 11 pages.

(Continued)

*Primary Examiner* — Matthew T Martin
*Assistant Examiner* — Taylor Harrison Krone
(74) *Attorney, Agent, or Firm* — East IP P.C.

(57) ABSTRACT

This disclosure provides a secondary battery, including: a case; an electrode assembly disposed within the case and including a main body and two tabs; a cap assembly including a cap plate, a lower insulating member and an explosion-proof valve, the explosion-proof valve being disposed on the cap plate, the lower insulating member being disposed on a side of the cap plate close to the electrode assembly and including an inner side surface, an outer side surface, and a concave portion recessed from the inner side surface toward the outer side surface, the concave portion being in position corresponding to the explosion-proof valve, and the concave portion being used to buffer an expansion amount of the main body; and an insulating plate located on a side of the lower insulating member close to the electrode assembly and including a shielding segment which at least partially shields the concave portion.

11 Claims, 8 Drawing Sheets

(51) Int. Cl.
*H01M 50/317* (2021.01)
*H01M 50/533* (2021.01)
*H01M 50/543* (2021.01)

(52) U.S. Cl.
CPC ....... *H01M 50/533* (2021.01); *H01M 50/543* (2021.01); *H01M 2200/00* (2013.01)

(56) References Cited

U.S. PATENT DOCUMENTS

| | | | |
|---|---|---|---|
| 2006/0099504 A1 | 5/2006 | Kim | |
| 2009/0186269 A1 | 7/2009 | Kim et al. | |
| 2012/0064380 A1* | 3/2012 | Kim | H01M 50/103 429/66 |
| 2012/0064389 A1 | 3/2012 | Uh | |
| 2013/0273415 A1 | 10/2013 | Lee et al. | |
| 2014/0106207 A1* | 4/2014 | Kim | H01M 50/579 429/174 |
| 2014/0127538 A1* | 5/2014 | Uruno | H01M 50/30 429/53 |
| 2014/0377640 A1 | 12/2014 | Takenouchi et al. | |
| 2015/0104677 A1* | 4/2015 | Koh | H01M 10/425 429/7 |
| 2017/0040575 A1 | 2/2017 | Bang | |
| 2017/0222209 A1 | 8/2017 | Hattori et al. | |
| 2017/0352845 A1 | 12/2017 | Li et al. | |
| 2018/0076440 A1* | 3/2018 | Yoshida | H01M 50/103 |
| 2018/0166676 A1* | 6/2018 | Xing | H01M 50/593 |
| 2018/0183035 A1 | 6/2018 | Hirose et al. | |
| 2018/0261806 A1* | 9/2018 | Kawate | H01M 50/474 |
| 2019/0207185 A1 | 7/2019 | Lee et al. | |
| 2019/0221790 A1 | 7/2019 | Xing | |
| 2020/0052265 A1* | 2/2020 | Wakimoto | H01M 50/533 |
| 2021/0280952 A1 | 9/2021 | Wakimoto et al. | |
| 2022/0255200 A1 | 8/2022 | Yamamoto | |

FOREIGN PATENT DOCUMENTS

| | | | |
|---|---|---|---|
| CN | 202888254 U | 4/2013 | |
| CN | 103137910 A | 6/2013 | |
| CN | 103383997 A | 11/2013 | |
| CN | 103650202 A | 3/2014 | |
| CN | 104103853 A | 10/2014 | |
| CN | 104205422 A | 12/2014 | |
| CN | 104347827 A | 2/2015 | |
| CN | 204760444 U | 11/2015 | |
| CN | 105374955 A | 3/2016 | |
| CN | 105518904 A | 4/2016 | |
| CN | 205723710 U | 11/2016 | |
| CN | 106601940 A | 4/2017 | |
| CN | 107210494 A | 9/2017 | |
| CN | 107534115 A | 1/2018 | |
| CN | 107732129 A | 2/2018 | |
| CN | 207038571 U | 2/2018 | |
| CN | 108428852 A | 8/2018 | |
| CN | 207800666 U | 8/2018 | |
| CN | 208062179 U | 11/2018 | |
| CN | 109075286 A | 12/2018 | |
| CN | 208489243 U | 2/2019 | |
| CN | 109417134 A | 3/2019 | |
| CN | 110021727 A | 7/2019 | |
| CN | 209183613 U | 7/2019 | |
| CN | 111029488 A | 4/2020 | |
| CN | 111029489 A | 4/2020 | |
| JP | 2017098207 A | 6/2017 | |
| JP | 2017157342 A | 9/2017 | |
| JP | 2018055893 A | 4/2018 | |
| JP | 2018056084 A | 4/2018 | |
| JP | 2018063854 A | 4/2018 | |
| JP | 2019133854 A | 8/2019 | |
| WO | WO-2018079423 A1 * | 5/2018 | ............ H01M 10/04 |

OTHER PUBLICATIONS

The Second Office Action for China Application No. 201910749967.2, dated May 11, 2021, 7 pages.
The notification to grant for China Application No. 201910749967.2, dated Jul. 22, 2021, 7 pages.
The International search report for PCT Application No. PCT/CN2020/108202, dated Nov. 11, 2020, 12 pages.
The extended European search report for EP Application No. 20852519.6, dated Mar. 14, 2022, 5 pages.
The First Examination Report for EP Application No. 20852519.6, dated Jun. 8, 2022, 3 pages.
The extended European search report for EP Application No. 20853251.5, dated Feb. 25, 2022, 7 pages.
PCT International Search Report for PCT/CN2020/108180, dated Nov. 11, 2020, 12 pages.
The First Office Action for China Application No. 201910749321.4, dated Mar. 15, 2021, 21 pages.
The Notification Grant for China Application No. 201910749321.4, dated May 24, 2021, 7 pages.
The First Office Action for U.S. Appl. No. 17/489,681, dated Feb. 29, 2024, 37 pages.
Johnson and Pennington; "Concavein Geometry | Definition, Shapes & Functions" From: Study.com (Year:2023).
The Florida Center for Instructional Technology, College of Education, University of South Florida; Clip Art ETC is a part of the Educational Technology Clearinghouse. From <https://etc.usf.edu/clipart/42000/42023/pro_120_42023.htm> and <https://etc.usf.edu/clipart/42000/42033/pro_170_42033.htm> (Year: 2024).
Advisory Action for U.S. Appl. No. 17/489,681, dated Dec. 3, 2024, 5 pages.
The Office Action after 1st RCE for U.S. Appl. No. 17/489,681, dated May 27, 2025, 29 pages.
The Notice of Allowance for U.S. Appl. No. 17/489,681, dated Aug. 28, 2025, 11 pages.

* cited by examiner

SECONDARY BATTERY

CROSS-REFERENCE TO RELATED APPLICATION

This application is a continuation of International Application No. PCT/CN2020/108202, filed on Aug. 10, 2020, which claims priority of the Chinese patent application No. 201910749967.2, entitled "SECONDARY BATTERY" and filed on Aug. 14, 2019, the entirety of which is incorporated herein by reference.

TECHNICAL FIELD

The present disclosure relates to the technical field of the battery, and in particular to a secondary battery.

BACKGROUND

With development of science and technology, secondary batteries have been widely used in portable electronic devices such as mobile phones, digital cameras, and laptop computers, and have broad application prospects in electric traffic tools such as electric vehicles and electric bicycles and in large and medium-sized electric appliances such as energy storage facilities, and have become important technical means to solve global problems such as energy crisis and environmental pollution. The secondary battery includes a case, an electrode assembly housed within the case, and a cap assembly sealingly connected with the case. The cap assembly includes a cap plate, an explosion-proof valve disposed on the cap plate, and a lower insulating member disposed below the cap plate. The lower insulating member can prevent a short circuit between the electrode assembly and the cap plate. However, during charging and discharging, the electrode assembly may expand and is thus very prone to cause deformation of the lower insulating member. The deformed lower insulating member will squeeze the explosion-proof valve, thereby affecting the preset burst pressure of the explosion-proof valve, resulting in presence of potential safety hazards in the secondary battery.

SUMMARY

An embodiment of the present disclosure provides a secondary battery that can buffer the expansion amount of the electrode assembly by the insulating plate and the concave portion of the lower insulating member, resulting in the lower insulating member being not prone to deform to squeeze the explosion-proof valve, ensuring the preset burst pressure of the explosion-proof valve being maintained in a normal state, improving the safety of secondary battery in use.

In one aspect, an embodiment of the present disclosure provides a secondary battery including: a case including an opening; an electrode assembly disposed within the case, the electrode assembly including a main body and two tabs, the two tabs extending outwards from two sides of the main body in an axial direction, respectively, and being both disposed facing the case; a cap assembly including a cap plate, a lower insulating member and an explosion-proof valve, the cap plate sealing the opening, the explosion-proof valve being disposed on the cap plate, the lower insulating member being disposed on a side of the cap plate close to the electrode assembly, the lower insulating member including an inner side surface facing the main body, an outer side surface facing the cap plate, and a concave portion recessed from the inner side surface toward the outer side surface, the concave portion being in position corresponding to the explosion-proof valve, and the concave portion for buffering an amount of expansion and deformation of the main body; and an insulating plate connected to the lower insulating member and located on a side of the lower insulating member close to the electrode assembly, the insulating plate including a shielding segment which at least partially shields the concave portion.

According to the above-mentioned embodiment of the present disclosure, the insulating plate includes two connecting segments, and the two connecting segments are disposed on opposite sides of the shielding segment along the axial direction, respectively, and the insulating plate is connected to the lower insulating member by the two connecting segments.

According to any one of the above-mentioned embodiments of the present disclosure, the secondary battery may further include a current collecting member including a connecting portion, the cap assembly further includes an electrode terminal connected to the cap plate, the electrode terminal is connected with the connecting portion, and the connecting segment covers a surface of the connecting portion and the electrode terminal each facing the electrode assembly.

According to any one of the above-mentioned embodiments of the present disclosure, the secondary battery may further include a bonding member, the bonding member being disposed between the connecting segment and the lower insulating member, the shielding segment being not disposed between the shielding segment and the lower insulating member, and the connecting segment is bonded to the lower insulating member through the bonding member.

For example, the bonding member has a thickness from 0.5 μm to 15 μm, and has a bonding strength greater than 0.05 N/mm².

According to any one of the above-mentioned embodiments of the present disclosure, the concave portion may include a first inclined surface and a second inclined surface which are distributed along the axial direction, the first inclined surface and the second inclined surface are both inclined from the inner side surface toward the outer side surface, the explosion-proof valve is located between the first inclined surface and the second inclined surface, and the first inclined surface and the second inclined surface become close to each other in a direction from the inner side surface to the outer side surface.

For example, the first inclined surface and the inner side surface may be both flat surfaces, and an angle formed between the first inclined surface and the inner side surface is from 120° to 170°; and/or, the second inclined surface and the inner side surface may be both flat surfaces, and an angle formed between the second inclined surface and the inner side surface is from 120° to 170°.

According to any one of the above-mentioned embodiments of the present disclosure, gaps are formed between the shielding segment and the first inclined surface and between the shielding segment and the second inclined surface in the direction from the inner side surface to the outer side surface, respectively.

Optionally, the gap has a size that gradually increases.

Optionally, a portion of the lower insulating member corresponding to the first inclined surface has a thickness that gradually decreases in a direction approaching the explosion-proof valve; and/or, a portion of the lower insulating member corresponding to the second inclined surface has a thickness that gradually decreases in the direction approaching the explosion-proof valve.

According to any one of the above-mentioned embodiments of the present disclosure, the insulating plate is formed of an elastic structural body, the insulating plate has a thickness from 0.05 mm to 5 mm and has a Young's elastic modulus from 500 MPa to 10000 MPa.

According to any one of the above-mentioned embodiments of the present disclosure, the shielding segment has a maximum width smaller than that of the concave portion in a direction perpendicular to the axial direction; or the insulating plate includes a through hole provided at the shielding segment, and the through hole is in communication with the concave portion.

In the secondary battery according to the embodiment of the present disclosure, the insulating plate is disposed between the lower insulating member and the main body, and the shielding segment of the insulating plate at least partially shields the concave portion. Therefore, even if the main body of the electrode assembly may expand during use to cause a portion of the main body facing the opening of the case to expand toward a direction approaching the lower insulating member, the shielding segment will firstly apply restraints to the main body to restrict the amount of expansion and deformation of the main body. After the expansion degree of the main body continues to increase and squeeze the shielding segment to cause a relatively large deformation, the concave portion will further absorb and buffer the amount of expansion and deformation of the main body, so the expanding main body will exert no or relatively low compressive stress on the lower insulating member, at the concave portion. In this way, during use of the secondary battery, the possibility of deformation of the lower insulating member due to being squeezed by the expanding main body can be reduced, thereby the possibility of affecting the original preset burst pressure of the explosion-proof valve due to the deformation of the lower insulating member to squeeze the explosion-proof valve can be reduced, and the safety of the secondary battery in use can be improved.

DESCRIPTION OF THE DRAWINGS

The features, advantages, and technical effects of the exemplary embodiments of the present disclosure will be described below with reference to the accompanying drawings.

Figure 1:
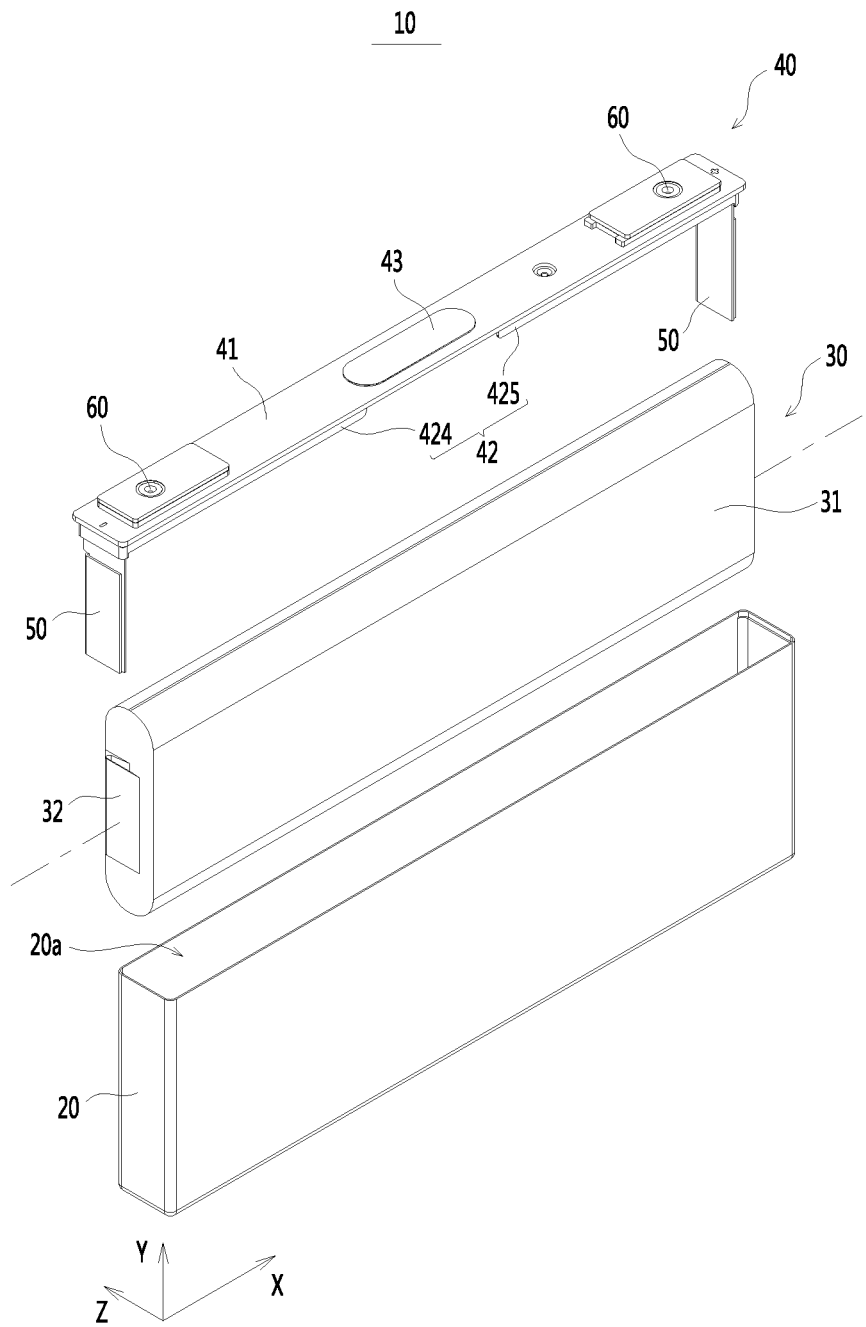
FIG. 1 is a schematic view of an exploded structure of a secondary battery according to an embodiment of the present disclosure.

In the drawings, the figures are not drawn to actual scale.

DESCRIPTION OF REFERENCE NUMERALS

10: secondary battery;
20: case; 20*a*: opening;
30: electrode assembly; 31: main body; 32: tab;
40: cap assembly;
41: cap plate;
42: lower insulating member; 421: inner side surface; 422: outer side surface; 423: concave portion; 423*a*: first inclined surface; 423*b*: second inclined surface; 424: first insulating plate; 424*a*: first end surface; 425: second insulating plate; 425*a*: second end surface; 426: accommodating portion;
43: explosion-proof valve;
50: current collecting member; 51: connecting portion; 52: current collecting portion;
60: electrode terminal;
70: insulating plate; 70*a*: shielding segment; 70*b*: connecting segment;
80: bonding member;
X: axial direction; Y: thickness direction; Z: width direction.

DETAILED DESCRIPTION

The implementation of the present disclosure will be described in further detail below in conjunction with the accompanying drawings and embodiments. The detailed description of the following embodiments and drawings are used to exemplarily illustrate the principle of the present disclosure, rather than used to limit the scope of the present disclosure. That is, the present disclosure is not limited to the described embodiments.

In the description of the present disclosure, it should be stated, unless otherwise specified, "a plurality of" refers to two or more; and the directions or positional relationships indicated by the terms such as "upper", "lower", "left", "right", "inner", "outside" and the like, are only for the convenience of describing the present disclosure and simplifying the description, and do not mean or imply that the involved device or element must have a specific orientation or must be configured or operated in the specific orientation, therefore, they cannot be understood as limiting the present disclosure. In addition, the terms "first", "second" and the like are only used for descriptive purposes, and should not be interpreted as indicating or implying relative importance. The term "perpendicular" need not be strictly perpendicular, but allows for an allowable amount of error. The term "parallel" need not be strictly parallel, but allows for an allowable amount of error.

The orientation terms appearing in the following description refer to the directions shown in the drawings, and are not intended to limit the specific structure of the present disclosure. In the description of the present disclosure, it should also be stated, unless otherwise specified and limited, the terms "mounted", "connected to", "connected with" or the like should be understood in a broad sense. For example, a connection may refer to a fixed connection or a disassembly connection; or may refer to an integral connection; or may refer to a direct connection or an indirect connection through an intermediate medium. For the ordinary person skilled in the art, the specific meanings of the above terms in the present disclosure may be understood according to specific situations.

Figure 2:
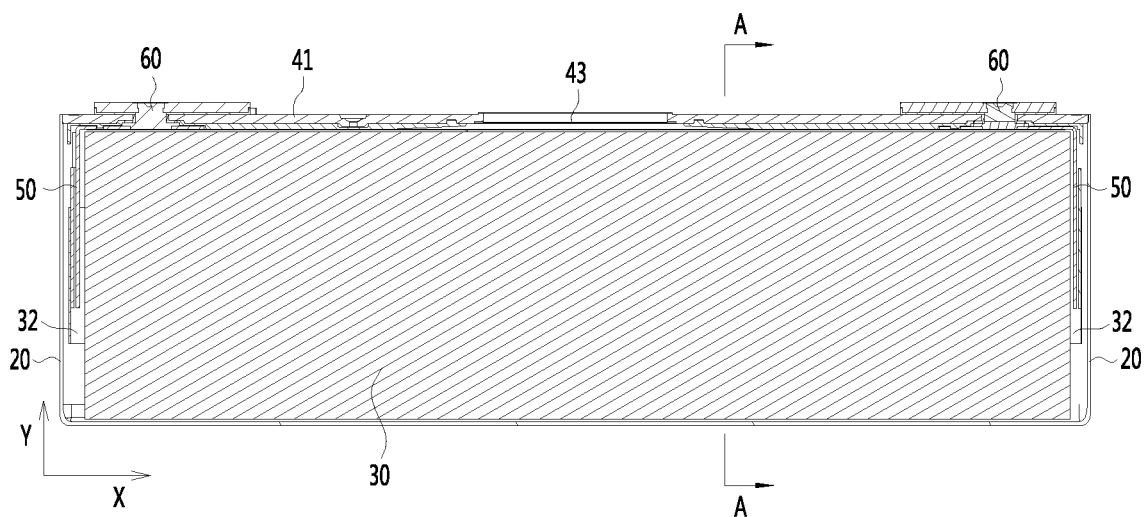
FIG. 2 is a schematic cross-sectional view of the secondary battery according to the embodiment shown in FIG. 1.
Figure 3:
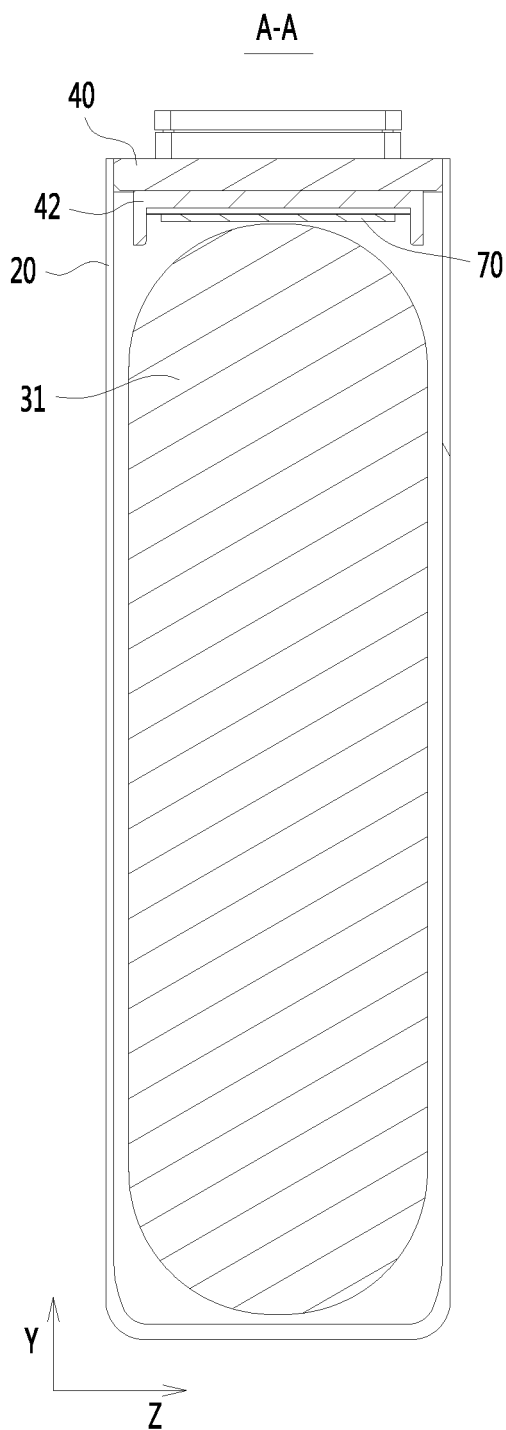
FIG. 3 is a cross-sectional view taken along A-A direction shown in FIG. 2.

Referring to FIGS. 1 to 3, a secondary battery 10 according to an embodiment of the present disclosure includes a case 20, an electrode assembly 30 disposed within the case 20, and a cap assembly 40 sealingly connected with the case 20.

The case 20 in the embodiment of the present disclosure is formed in a shape of square or in other shapes. The case 20 has an internal space where the electrode assembly 30 and the electrolyte are accommodated and an opening 20a which is in communication with the internal space. The case 20 may be made of a material such as aluminum, aluminum alloy, and plastic.

The electrode assembly 30 in the embodiment of the present disclosure has a main body 31 formed by stacking or winding a first electrode plate, a second electrode plate and a separator located between the first electrode plate and the second electrode plate together, wherein the separator is an insulating member interposed between the first electrode plate and the second electrode plate. The main body 31 in present embodiment as a whole is formed in a flat shape, and has a predetermined thickness, height, and width. An axial direction of the main body 31 is its own height direction. The main body 31 has two end surfaces opposed to each other in an axial direction X thereof. In the present embodiment, the description is made by exemplarily taking the first electrode plate as a positive electrode plate, and taking the second electrode plate as a negative electrode plate. Similarly, in other embodiments, the first electrode plate may be a negative electrode plate, and the second electrode plate is a positive electrode plate. Further, a positive active material is coated on a coating portion of the positive electrode plate, and a negative active material is coated on a coating portion of the negative electrode plate. The uncoated region extending outwards from the coated portion of the main body 31 serves as a tab 32. The electrode assembly 30 includes two tabs 32, namely a positive tab and a negative tab, wherein the positive tab extends outwards from the coated region of the positive electrode plate, and the negative tab extends outwards from the coated region of the negative electrode plate. Each of the tabs 32 extends outwards from each of the two end surfaces of the main body 31, so the two tabs 32 are disposed opposite to each other in the axial direction X. The two end surfaces of the main body 31 and the two tabs 32 are disposed facing the case 20. The main body 31 has wide surfaces and narrow surfaces which are connected to each other and are disposed alternatively with each other in a circumferential direction of the main body 31. Optionally, the narrow surface of the main body 31 faces the opening 20a of the case 20. During use of the secondary battery 10, the main body 31 may expand, and both the wide surface and the narrow surface will have a certain amount of expansion and deformation.

The cap assembly 40 in the embodiment of the present disclosure includes a cap plate 41, a lower insulating member 42 and an explosion-proof valve 43. The cap plate 41 is connected to the case 20 and seals the opening 20a of the case 20. The cap plate 41 includes a mounting hole for mounting the explosion-proof valve 43. The explosion-proof valve 43 is connected to the cap plate 41 and covers the mounting hole. Optionally, the explosion-proof valve 43 is formed in a sheet-like shape. The lower insulating member 42 is disposed on a side of the cap plate 41 close to the electrode assembly 30. The lower insulating member 42 includes an inner side surface 421 facing the main body 31, an outer side surface 422 facing the cap plate 41, and a concave portion 423 recessed from the inner side surface 421 toward the outer side surface 422. The concave portion 423 and the explosion-proof valve 43 are in positions corresponding to each other and are spaced apart from the main body 31 by a predetermined distance. The concave portion 423 of the lower insulating member 42 is used to buffer the amount of expansion and deformation of the main body 31.

The secondary battery 10 further includes an electrode terminal 60 disposed on the cap plate 41 and a current collecting member 50 connecting the electrode terminal 60 and the tab 32. The cap plate 41 is provided with two electrode terminals 60. Also there are two current collecting members 50. Each of the electrode terminals 60 is connected to a corresponding tab 32 through one current collecting member 50. The current collecting member 50 includes a connecting portion 51 connected and fixed to the electrode terminal 60 and a current collecting portion 52 connected with the tab 32. The connecting portion 51 is connected to a portion of the electrode terminal 60 close to the electrode assembly 30. The collecting portion 52 is at least partially located between the end surface of the main body 31 and the case 20 and is welded to the tab 32.

Figure 4:
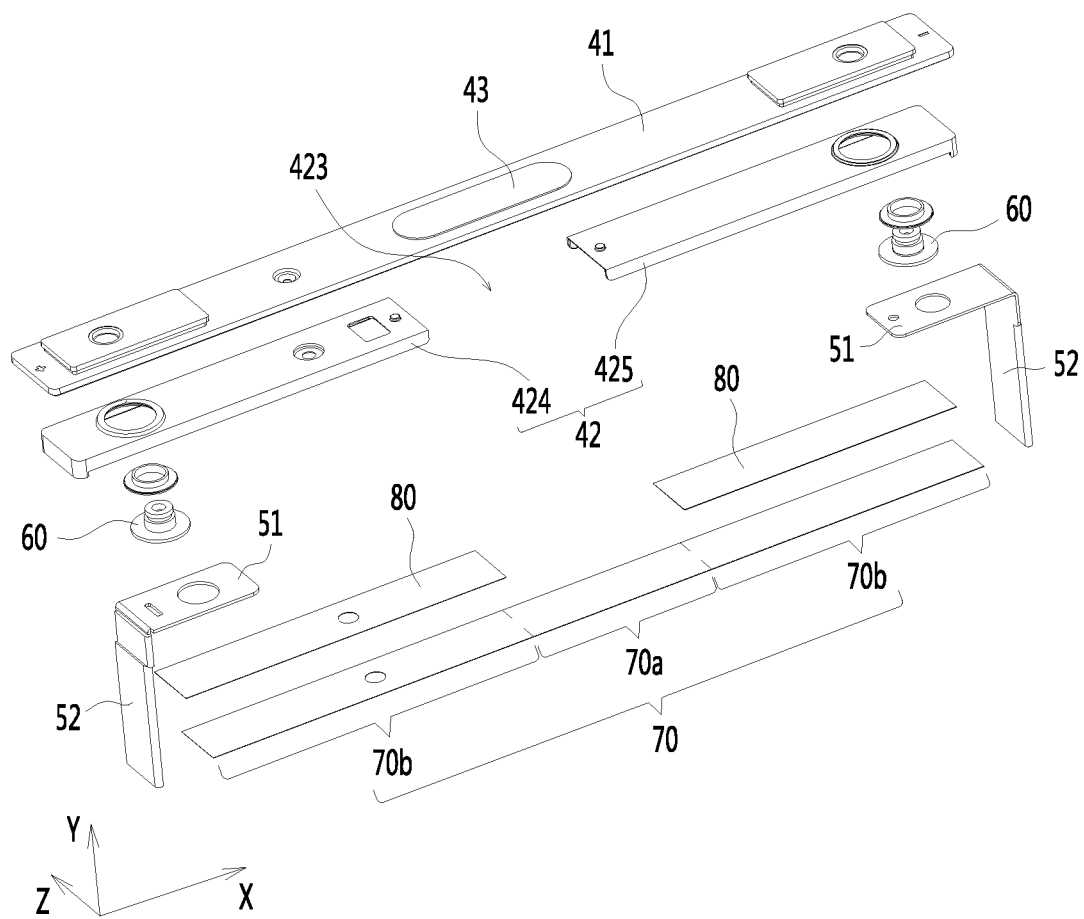
FIG. 4 is a schematic view of a partial exploded structure of a secondary battery according to an embodiment of the present disclosure.

Referring to FIGS. 3 and 4, the secondary battery 10 in the embodiment of the present disclosure further includes an insulating plate 70 connected to the lower insulating member 42. The insulating plate 70 is disposed on a side of the lower insulating member 42 close to the electrode assembly 30. The insulating plate 70 includes a shielding segment 70a. The shielding segment 70a at least partially shields the concave portion 423. When the main body 31 expands, the main body 31 will exert a compressive stress on the shielding segment 70a. Since the insulating plate 70 is connected and fixed to the lower insulating member 42, when the main body 31 expands, the insulating plate 70 can apply a restraining stress to the main body 31 via the shielding segment 70a, so the amount of expansion and deformation of the main body 31 can be restricted to a certain extent and the expansion degree of the region of the main body 31 corresponding to the concave portion 423 tends to be the consistent with that of other regions of the main body 31.

During use of the secondary battery 10 according to the embodiment of the present disclosure, the main body 31 of the electrode assembly 30 may expand. A portion of the main body 31 facing the opening 20a of the case 20 may expand toward a direction approaching the lower insulating member 42. Since the insulating plate 70 is disposed between the lower insulating member 42 and the main body 31 and the shielding segment 70a of the insulating plate 70 at least partially shields the concave portion 423, the shielding segment 70a will firstly apply restraints to the main body 31 to restrict the amount of expansion and deformation of the main body 31. After the expansion degree of the main body 31 continues to increase and squeeze the shielding segment 70a to cause a relatively large deformation, the concave portion 423 will further absorb and buffer the amount of expansion and deformation of the main body 31, so the expanding main body 31 will exert no compressive or relatively low stress on the lower insulating member 42, at the concave portion 423. In this way, during use of the secondary battery 10, the possibility of deformation of the lower insulating member 42 due to being squeezed by the expanding main body 31 can be reduced, thereby the possibility of affecting the original preset burst pressure of the explosion-proof valve 43 due to the deformation of the lower insulating member 42 to squeeze the explosion-proof valve 43 can be reduced, and the safety of the secondary battery 10 in use can be improved.

Figure 5:
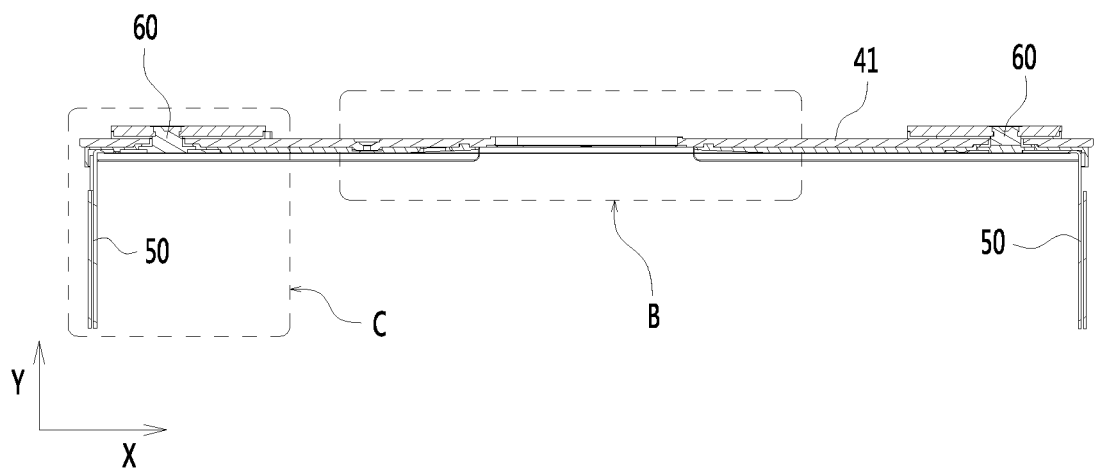
FIG. 5 is a schematic cross-sectional view of the secondary battery according to the embodiment shown in FIG. 4.
Figure 6:
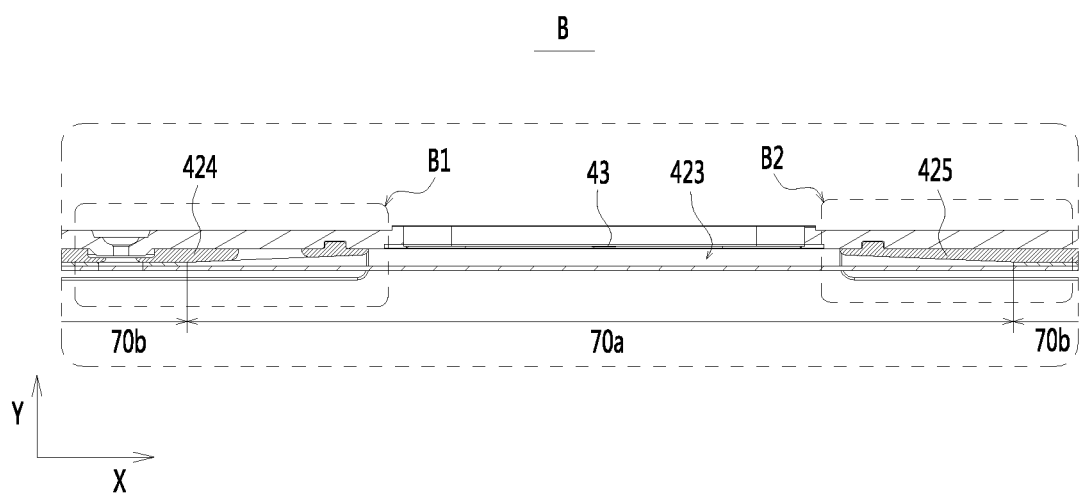
FIG. 6 is an enlarged view of portion B in FIG. 5.

Referring to FIGS. 4 to 6, the insulating plate 70 includes two connecting segments 70b connected to the shielding segment 70a. The two connecting segments 70b are disposed on opposite sides of the shielding segment 70a along the axial direction X of the main body 31, respectively. The insulating plate 70 is connected to the lower insulating member 42 by two connecting segments 70b. When the expanding main body 31 exerts a compressive stress on the shielding segment 70a, the shielding segment 70a will bend and deform toward the concave portion 423, and therefore the shielding segment 70a itself will bear a tensile stress. After the insulating plate 70 is connected and fixed to the lower insulating member 42 by the connecting segments 70b, the two connecting segments 70b will simultaneously pull the shielding segment 70a and transfer the tensile stress of the shielding segment 70a to the lower insulating member 42. Since the connecting area between the connecting segment 70b and the lower insulating member 42 in the axial direction X is relatively large, the ultimate tensile stress that can be borne by the connecting segment 70b is relatively large, thereby ensuring that the shielding segment 70a can bear a relatively large tensile stress, reducing the possibility of the shielding segment 70a being prone to be disconnected from the lower insulating member 42 due to being squeezed by the main body 31, further reducing the possibility of failure in the function of the shielding segment 70a that restrains the amount of expansion and deformation of the main body 31. In an example, the connecting segment 70b covers a surface of the connecting portion 51 of the current collecting member 50 facing the electrode assembly 30 and a surface of the electrode terminal 60 facing the electrode assembly 30, and therefore, the connecting segment 70b insulates and isolates the connecting portion 51 and the electrode assembly 30 from the electrode terminal 60 and the electrode assembly 30, reducing the possibility of electrical connection between the connecting portion 51 as well as the electrode terminal 60 and the electrode assembly 30, and improving the safety of the secondary battery 10 in use.

Figure 7:
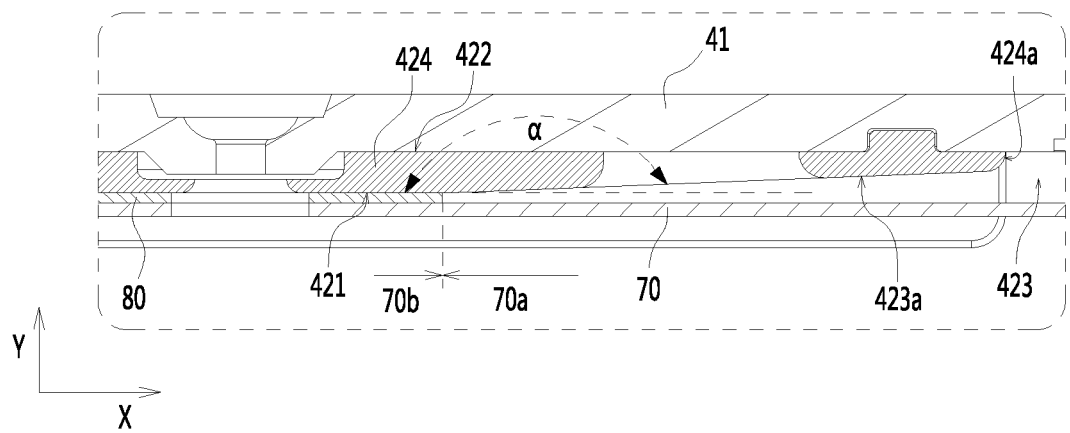
FIG. 7 is an enlarged view of portion B1 in FIG. 6.
Figure 8:
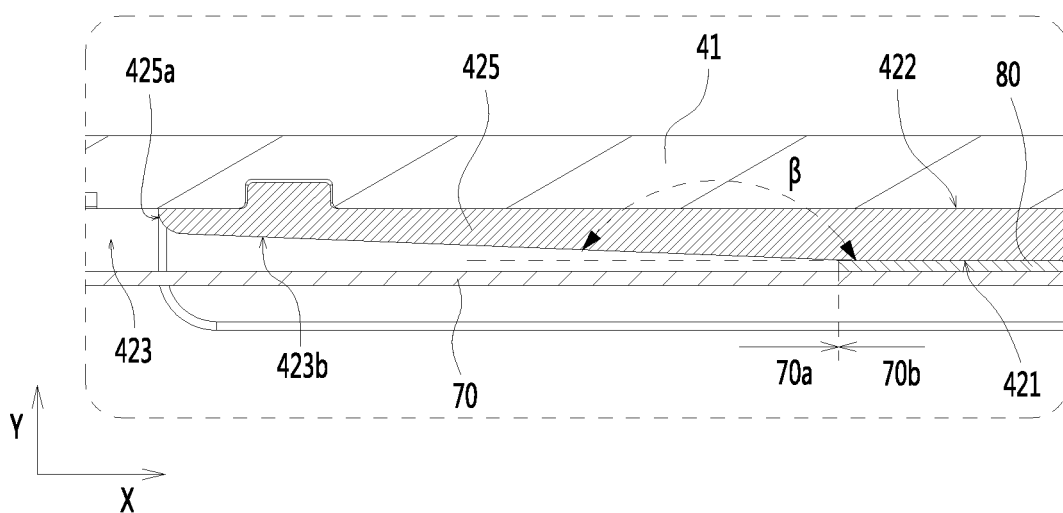
FIG. 8 is an enlarged view of portion B2 in FIG. 6.

Referring to FIGS. 4, 7 and 8, the secondary battery 10 further includes a bonding member 80. The connecting segment 70b of the insulating plate 70 is directly bonded and fixed to the inner side surface 421 of the lower insulating member 42 via the bonding member 80. Such connecting manner is simple and reliable. The bonding member 80 is disposed between the connecting segment 70b and the lower insulating member 42. Optionally, the bonding member 80 may be a bonding glue, a double-sided bonding tape or the like. In the present embodiment, the bonding member 80 is not disposed between the shielding segment 70a of the insulating plate 70 and the lower insulating member 42. No disposal of the bonding member 80 means that the bonding member 80 is discontinuous at the shielding segment 70a and the bonding member 80 is only disposed at the connecting segment 70b. When the expanding main body 31 exerts a compressive stress on the shielding segment 70a, there is a possibility that the shielding segment 70a may come into contact with the concave portion 423 or the explosion-proof valve 43. Since the bonding member 80 is not disposed at the shielding segment 70a, the possibility of failure in restraining function of the shielding segment 70a can be prevented that is caused by the inability of the shielding segment 70a to return to the initial position due to the shielding segment 70a being bonded to the concave portion 423 by the bonding member 80 after the shielding segment 70a comes into contact with the concave portion 423. In addition, since the bonding member 80 is not disposed at the shielding segment 70a, it can be prevented that the shielding segment 70a is bonded to the explosion-proof valve 43 by the bonding member 80 after the shielding segment 70a comes into contact with the explosion-proof valve 43. In this way, on one hand, it is possible to prevent malfunction of the explosion-proof valve 43 that is caused by the original preset burst pressure of the explosion-proof valve 43 being affected under the pulling of the elastic restoring force of the shielding segment 70a due to the inability to separate the shielding segment 70a from the explosion-proof valve 43 smoothly after the main body 31 is contracted; on the other hand, it is possible to prevent the possibility of failure in restraining function of the shielding segment 70a due to the inability of the shielding segment 70a to return to the initial position.

In an embodiment, the bonding member 80 has a thickness from 0.5 μm to 15 μm in the thickness direction Y. When the thickness of the bonding member 80 is less than 0.5 μm, the bonding strength and the structural strength of the bonding member 80 are relatively low. In such a case, when the tensile stress borne along the axial direction X by the connecting segment 70b is greater than the bonding bearing capacity, it is prone to cause failure in bonding of the bonding member 80 or separation of the bonding member 80 from the lower insulating member 42 resulting from its own fracture. The main body 31 will squeeze the shielding segment 70a when expanding, so there is a situation in which the shielding segment 70a pulls the connecting segment 70b and separates the connecting segment 70b from the lower insulating member 42, resulting in the failure in the restraining function of the shielding segment 70a and the inability to effectively exert a restraining force on the main body 31. When the thickness of the bonding member 80 is greater than 15 μm, the thickness of the bonding member 80 itself is relatively large, resulting in occupying more space in the thickness direction Y, reducing the compactness of the structure, thereby reducing the energy density of the secondary battery 10. In order to prevent the connecting segment 70b from being separated from the lower insulating member 42 under the pulling of the shielding segment 70a, the bonding strength of the bonding member 80 is greater than 0.05 N/mm$^2$.

Referring to FIGS. 4 and 6, the lower insulating member 42 includes a first insulating plate 424 and a second insulating plate 425 which are spaced apart from each other along the axial direction X. The first insulating plate 424 and the second insulating plate 425 are located on two sides of the explosion-proof valve 43, respectively. An avoidance gap is formed between the first insulating plate 424 and the second insulating plate 425. The avoidance gap is in position corresponding to the explosion-proof valve 43, so the lower insulating member 42 avoids the explosion-proof valve 43 by the avoidance gap, thereby ensuring that the airflow can smoothly pass through the avoidance gap and can be discharged from the explosion-proof valve 43 when the pressure inside the secondary battery 10 exceeds the preset burst stress of the explosion-proof valve 43. Furthermore, the lower insulating member 42 is prone to soften when in a high temperature environment. If no gap is provided on a region where the lower insulating member 42 directly faces the explosion-proof valve 43, the softened lower insulating member 42 will clung tightly to the periphery of the explosion-proof valve. 43, thereby affecting the preset burst stress of the explosion-proof valve 43.

Referring to FIGS. 7 and 8, the concave portion 423 includes a first inclined surface 423a and a second inclined surface 423b which are distributed along the axial direction X of the main body 31. Both the first inclined surface 423a and the second inclined surface 423b are inclined from the inner side surface 421 toward the outer side surface 422. The explosion-proof valve 43 is located between the first inclined surface 423a and the second inclined surface 423b. The first insulating plate 424 includes the inner side surface 421 and a first end surface 424a facing the second insulating plate 425. The first inclined surface 423a is disposed at the first insulating plate 424 and connects the inner side surface 421 with the first end surface 424a of the first insulating plate 424. The second insulating plate 425 includes the inner side surface 421 and a second end surface 425a facing the first insulating plate 424. The first end surface 424a and the second end surface 425a are spaced apart from each other to form the avoidance gap that is in communication with the concave portion 423. The second inclined surface 423b is disposed at the second insulating plate 425 and connects the inner side surface 421 with the second end surface 425a of the second insulating plate 425. The first inclined surface 423a and the second inclined surface 423b become close to each other in a direction from the inner side surface 421 to the outer side surface 422, that is, the distance between the first inclined surface 423a and the second inclined surface 423b in the axial direction X of the main body 31 gradually decreases.

In the present embodiment, for ease of description, a portion of the main body 31 corresponding to the inner side surface 421 is indicated as a first region, and a portion of the main body 31 corresponding to the concave portion 423 is indicated as a second region. The bonding member 80 is disposed between the first region and the inner side surface 421. After the main body 31 expands, the second region of the main body 31 will squeeze the shielding segment 70a into the concave portion 423. When the shielding segment 70a comes into contact with the first inclined surface 423a and the second inclined surface 423b, the first inclined surface 423a and the second inclined surface 423b will exert a restraining force on the second region by the shielding segment 70a, so the concave portion 423 together with the shielding segment 70a will exert a restraining force on the second region and reduce the expansion amount of the main body 31 to a certain extent. The first inclined surface 423a and the second inclined surface 423b have slopes, so no stress concentration will occur when the first inclined surface 423a and the second inclined surface 423b come into contact with the shielding segment 70a, thereby reducing the possibility of partial structural damage to the shielding segment 70a or to the second region being in the expanded state by the lower insulating member 42.

In an example, referring to FIGS. 7 and 8, both the first inclined surface 423a and the second inclined surface 423b are in arc transition with the corresponding inner side surfaces 421, thereby reducing the sharpness of the transition region between the first inclined surface 423a and the inner side surface 421 and that of the transition region between the second inclined surface 423b and the inner side surface 421. When the main body 31 expands, the first region is restrained by the inner side surface 421 of the lower insulating member 42, whereas the second region is not restrained by the inner side surface 421 of the lower insulating member 42, so the expansion degree of the first region is smaller than that of the second region, resulting in the expansion amount of the first region being different from that of the second region. Since both the first inclined surface 423a and the second inclined surface 423b are in arc transition with the inner side surface 421, when the expanding main body 31 squeezes the insulating plate 70, the transition between the connecting segment 70b and the shielding segment 70a can be made smooth, and meanwhile, the transition between the first region and the second region can be made smooth. Therefore, the transition region between the inner side surface 421 of the lower insulating member 42 and the first inclined surface 423a does not apply a relatively large shear stress to the insulating plate 70 and the main body 31 along a direction perpendicular to the axial direction X, effectively reducing the possibility of shear structural damage to the insulating plate 70 or the main body 31 due to being squeezed by the transition region between the inner side surface 421 of the lower insulating member 42 and the first inclined surface 423a and by the transition region between the inner side surface 421 and the second inclined surface 423b. The direction perpendicular to the axial direction X indicates the same direction as the thickness direction Y of the cap plate 41. The shear structural damage to the insulating plate 70 includes cracks or fractures of the insulating plate 70, and the shear structural damage of the main body 31 includes cracks of the electrode plate or cracks of the separator. Optionally, the first inclined surface 423a is in arc transition with the first end surface 424a, and the second inclined surface 423b is in arc transition with the second end surface 425a, thereby reducing the sharpness of the transition region between the first inclined surface 423a and the first end surface 424a and that of the transition region between the second inclined surface 423b and the second end surface 425a. When the expansion amount of the second region of the main body 31 is large enough to squeeze the shielding segment 70a to approach the first end surface 424a and the second end surface 425a, the transition region between the first inclined surface 423a and the first end surface 424a, as well as the transition region between the second inclined surface 423b and the second end surface 425a, does not apply a relatively large shear stress to the shielding segment 70a and the second region of the main body 31 along the direction perpendicular to the axial direction X, effectively reducing the possibility of shear structural damage to the shielding segment 70a and the second region of the main body 31.

In an example, as shown in FIG. 7, the first inclined surface 423a and the inner side surface 421 are both flat surfaces. In the present embodiment, the flat surface refers to an approximately flat surface. An angle $\alpha$ formed between the first inclined surface 423a and the inner side surface 421 is from 120° to 170°. When the angle $\alpha$ formed between the first inclined surface 423a and the inner side surface 421 is less than 120°, the sharpness of the transition region between the first inclined surface 423a and the inner side surface 421 is still relatively large, and it is prone to apply a shear stress to the shielding segment 70a and the expanded main body 31 along the direction perpendicular to the axial direction X. When the angle $\alpha$ formed between the first inclined surface 423a and the inner side surface 421 is greater than 170°, the first inclined surface 423a is too close to the plane where the inner side surface 421 is located, resulting in the depth of the concave portion 423 in the direction from the inner side surface 421 to the outer side surface 422 being smaller. When the shielding segment 70a is squeezed into the concave portion 423, the shielding segment 70a will occupy too much space of the concave portion 423 in the depth direction, causing that the concave portion 423 does not achieve the effect of buffering the expansion amount of the main body 31 together with the shielding segment 70a. In another example, as shown in FIG. 8, the second inclined surface 423b and the inner side surface 421 are both flat surfaces. An angle $\beta$ formed between the second inclined surface 423b and the inner side surface 421 is from 120° to 170°. Similarly, when the angle β formed between the second inclined surface 423b and the inner side surface 421 is less than 120°, the sharpness of the transition region between the second inclined surface 423b and the inner side surface 421 is still relatively large, and it is prone to apply a shear stress to the shielding segment 70a and the expanded main body 31 along the direction perpendicular to the axial direction X. When the angle β formed between the second inclined surface 423b and the inner side surface 421 is greater than 170°, the second inclined surface 423b is too close to the plane where the inner side surface 421 is located, resulting in the depth of the concave portion 423 in the direction from the inner side surface 421 to the outer side surface 422 being smaller. When the shielding segment 70a is squeezed into the concave portion 423, the shielding segment 70a will occupy too much space of the concave portion 423 in the depth direction, causing that the concave portion 423 does not achieve the effect of buffering the expansion of the main body 31 together with the shielding segment 70a. Preferably, the angle α formed between the first inclined surface 423a and the inner side surface 421 and the angle β formed between the second inclined surface 423b and the inner side surface 421 are both 150°. Preferably, the first inclined surface 423a and the inner side surface 421 are both flat surfaces, and the angle α between the first inclined surface 423a and the inner side surface 421 is from 120° to 170°, and the second inclined surface 423b and the inner side surface 421 are flat surfaces, with the angle β formed between the second inclined surfaces 423b and the inner side surface 421 being from 120° to 170°.

Referring to FIGS. 7 and 8, in the direction from the inner side surface 421 to the outer side surface 422, gaps are formed between the shielding segment 70a and the first inclined surface 423a, and between the shielding segment 70a and the second inclined surface 423b, respectively, so the shielding segment 70a will not clung tightly to the first inclined surface 423a and the second inclined surface 423b. When the main body 31 expands to squeeze the shielding segment 70a, the shielding segment 70a will enter the gap between the shielding segment 70a and the first inclined surface 423a and the gap between the shielding segment 70a and the second inclined surface 423b and thus can be buffered. The lower insulating member 42 is prone to soften when in a high-temperature environment. If no gap is provided between the concave portion 423 of the lower insulating member 42 and the shielding segment 70a, the shielding segment 70a is prone to stick to the softened lower insulating member 42 under the squeezing of the main body 31. After the expanded main body 31 is contracted, the shielding segment 70a can no longer be separated from the lower insulating member 42, resulting in the failure in the restraining function of the shielding segment 70a. Preferably, the gap has a size that gradually increases.

In an example, a portion of the lower insulating member 42 corresponding to the first inclined surface 423a has a thickness that gradually decreases in a direction approaching the explosion-proof valve 43, and a portion of the lower insulating member 42 corresponding to the second inclined surface 423b has a thickness that gradually decreases in the direction approaching the explosion-proof valve 43. When the outer side surface 422 of the lower insulating member 42 comes into contact with the surface of the cap plate 41, since the thickness of the portion of the lower insulating member 42 corresponding to the first inclined surface 423a and the thickness of the portion of the lower insulating member 42 corresponding to the second inclined surface 423b gradually decrease, the space occupancy of the portion of the lower insulating member 42 corresponding to the first inclined surface 423a and the portion of the lower insulating member 42 corresponding to the second inclined surface 423b in the direction from the inner side surface 421 to the outer side surface 422 can be reduced, and the energy density of the secondary battery 10 can be improved.

Figure 9:
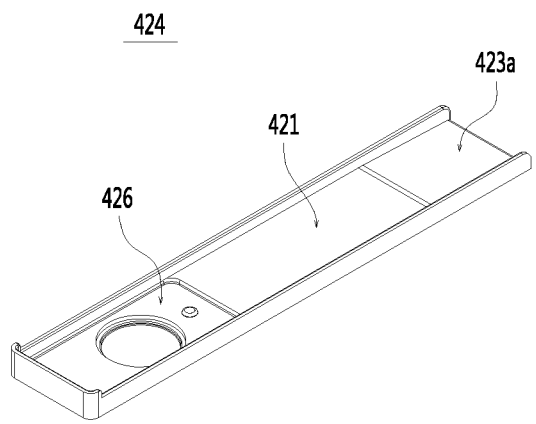
FIG. 9 is a schematic structural view of a first insulating plate according to an embodiment of the present disclosure.
Figure 10:
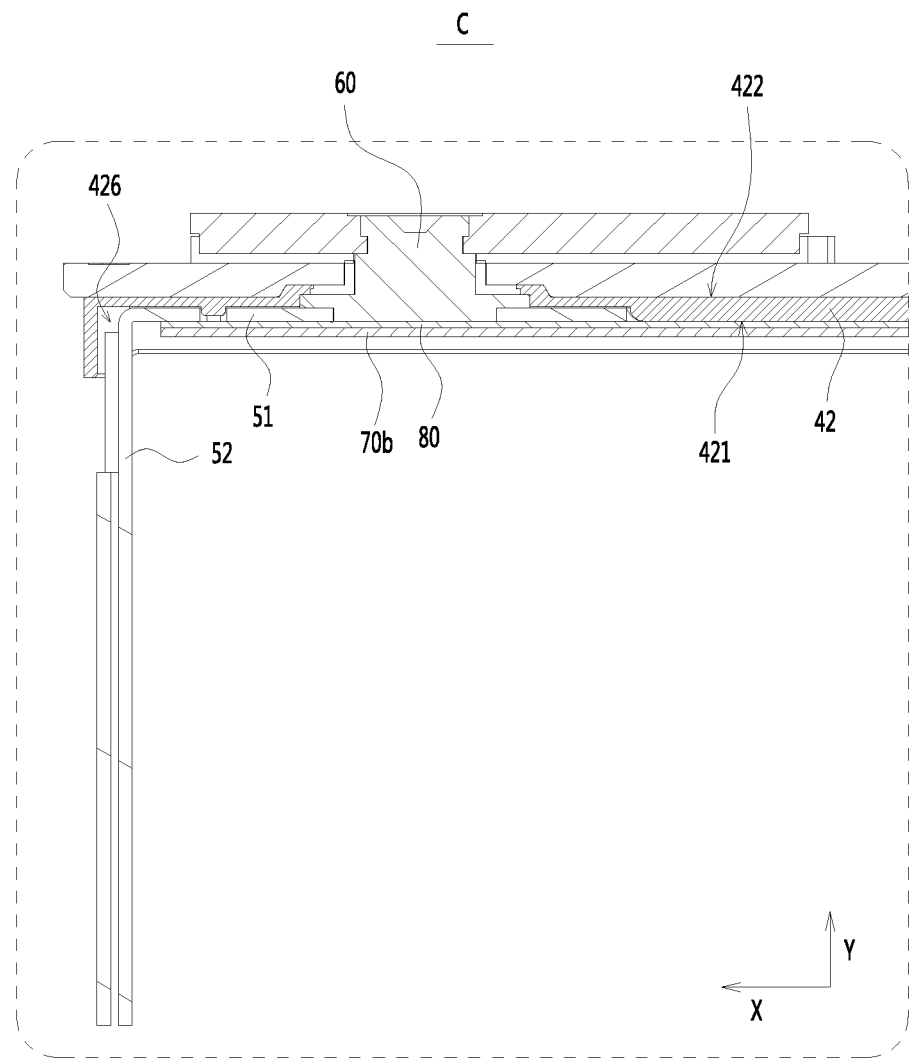
FIG. 10 is an enlarged view of portion C in FIG. 5.

Referring to FIGS. 9 and 10, the first insulating plate 424 of the lower insulating member 42 includes an accommodating portion 426 recessed from the inner side surface 421 to the outer side surface 422. The connecting portion 51 of the current collecting member 50 is accommodated in the accommodating portion 426 and connected to the electrode terminal 60. In this way, the structure of the lower insulating member 42 and the current collecting member 50 can be more compact, thereby reducing the space occupancy in the direction from the inner side surface 421 to the outer side surface 422, and increasing the energy density of the secondary battery 10. Bothe the connecting portion 51 of the current collecting member 50 and the electrode terminal 60 does not exceed the inner side surface 421 of the lower insulating member 42, thereby reducing the possibility of a shear structural damage to the corresponding region of the expanding main body 31 due to excessive shear stress applied by the connecting portion 51 or the electrode terminal 60 to the corresponding region. In an example, the second insulating plate 425 of the lower insulating member 42 also includes an accommodating portion 426 recessed from the inner side surface 421 to the outer side surface 422. In an embodiment, the connecting segment 70b and the bonding member 80 are both located on a side of the connecting portion 51 of the current collecting member 50 and the electrode terminal 60 close to the electrode assembly 30. The connecting segment 70b and the bonding member 80 cover the surface of the connecting portion 51 of the current collecting member 50 facing the electrode assembly 30 and the surface the electrode terminal 60 facing the electrode assembly 30, thereby reducing the possibility of the short circuit due to both the surface of the connecting portion 51 of the current collecting member 50 facing the electrode assembly 30 and the surface of the electrode terminal 60 facing the electrode assembly 30 coming into direct contact with the electrode assembly 30, and improving the safety of the secondary battery 10 in use.

The insulating plate 70 is formed of an elastic structural body and has good stretch resistance. When the main body 31 expands, the shielding segment 70a may deform to buffer the compressive stress from the main body 31, and meanwhile, may apply a reaction force to the main body 31 to restrain the main body 31. After the expanded main body 31 is contracted, the shielding segment 70a will return to its original position under its own elastic force. The insulating plate 70 has a thickness from 0.05 mm to 5 mm. When the thickness of the insulating plate 70 is less than 0.05 mm, the structural strength of the insulating plate 70 is relatively low, resulting in the failure in the restraint function of the insulating plate 70 due to the insulating plate 70 being prone to fracture when being squeezed by the expanding main body 31. When the thickness of the insulating plate 70 is greater than 5 mm, the insulating plate 70 itself has an excessively large thickness and occupies more space in the thickness direction Y, reducing the compactness of the structure, and thereby reducing the energy density of the secondary battery 10. The insulating plate 70 has a Young's elastic modulus from 500 MPa to 10000 MPa. When the elastic modulus of the insulating plate 70 is less than 500 Mpa, the insulating plate 70 is very prone to plastic deformation under the expansion and squeezing of the main body 31, resulting in the thickness of the insulating plate 70 being reduced, the strength being weakened, and cracks or fractures being prone to occur. When the elastic modulus of the insulating plate 70 is greater than 10000 Mpa, the insulating plate 70 will hardly be deformed under the expansion and squeezing of the main body 31, that is, the insulating plate 70 will restrain the expansion of the main body 31 excessively. Under the restraining force of the insulating plate 70, a portion of the electrolyte within the main body 31 will be squeezed out, resulting in insufficient electrolyte, which in turn causes inability of the lithium ions to pass through the diaphragm and initiates lithium precipitation. Preferably, the insulating plate 70 has an elastic modulus of 3000 Mpa to 8000 Mpa. In such a case, the structural strength of the insulating plate 70 itself can be effectively ensured, effective constraints can be exerted on the main body 31, and meanwhile, the electrode assembly 30 can be prevented from lithium precipitation and the cycle performance of the secondary battery 10 can be improved.

Figure 11:
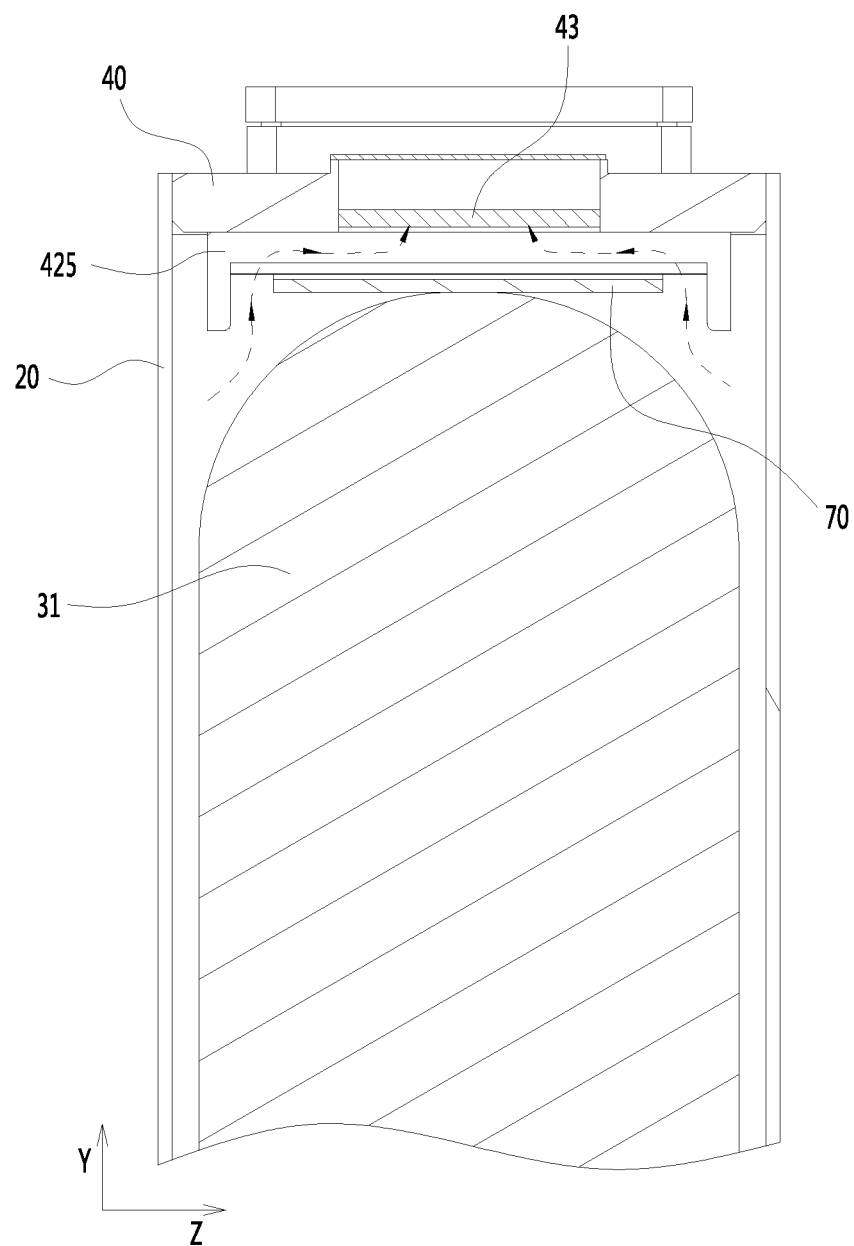
FIG. 11 is a schematic partial cross-sectional view of a secondary battery according to an embodiment of the present disclosure.

Referring to FIG. 11, the shielding segment 70a has a maximum width smaller than a maximum width of the concave portion 423 along a width direction Z. The width direction Z is a direction perpendicular to the axial direction X. In this way, an overcurrent gap is left on one side or two sides of the shielding segment 70a. When the pressure inside the secondary battery 10 exceeds the preset burst stress of the explosion-proof valve 43, the gas inside the case 20 will pass through the overflow gap and reach the explosion-proof valve 43, thereby reducing the possibility of the inability of the high-pressure airflow inside the case 20 to be quickly discharged from the explosion-proof valve 43 due to the insulating plate 70 obstructing the flow of the airflow, ensuring that the explosion-proof valve 43 can be normally opened, and improving the safety of the secondary battery 10 in use. In another example, the insulating plate 70 includes a through hole disposed on the shielding segment 70a. The through hole is in communication with the concave portion 423. When the pressure inside the secondary battery 10 exceeds the preset burst stress of the explosion-proof valve 43, the gas inside the case 20 will pass through the through hole and reach the explosion-proof valve 43, ensuring that the explosion-proof valve 43 can be normally opened and the high-pressure airflow can be quickly discharged.

During use of the secondary battery 10 according to the embodiments of the present disclosure, the main body 31 of the electrode assembly 30 may expand. In the embodiment of the present disclosure, since the secondary battery 10 includes the insulating plate 70 that is disposed adjacent to the main body 31 and functions to restrain the main body 31 and the lower insulating member 42 includes the concave portion 423 that is used for buffering the expansion amount of the main body 31, the expanding main body 31 will be restrained by the insulating plate 70 and buffered by the concave portion 423, and therefore, will not directly squeeze the region of the lower insulating member 42 corresponding to the explosion-proof valve 43. In this way, the expanding main body 31 will exert no or relatively low compressive stress on the lower insulating member 42. Therefore, the possibility of deformation of the lower insulating member 42 due to the squeezing action of the expanding main body 31 can be reduced, and the possibility of affecting the original preset burst pressure of the explosion-proof valve 43 due to the deformation of the lower insulating member 42 to squeeze the explosion-proof valve 43 can be reduced, and the safety of the secondary battery 10 in use can be improved.

Although the present disclosure has been described with reference to the preferred embodiments, various modifications may be made thereto and components thereof may be replaced with equivalents without departing from the scope of the present disclosure. In particular, as long as there is no structural conflict, the technical features mentioned in the embodiments can be combined in any manner. The present disclosure is not limited to the specific embodiments disclosed herein, but includes all technical solutions that fall within the scope of the claims.

What is claimed is:

1. A secondary battery comprising:
   a case comprising an opening;
   an electrode assembly disposed within the case, the electrode assembly comprising a main body and two tabs, the two tabs extending outwards from two sides of the main body in an axial direction, respectively, and being both disposed facing the case;
   a cap assembly comprising a cap plate, a lower insulating member, an explosion-proof valve, and electrode terminals connected to the cap plate, the cap plate sealing the opening, the explosion-proof valve being disposed on the cap plate, the lower insulating member being disposed on a side of the cap plate close to the electrode assembly, the lower insulating member comprising an inner side surface facing the main body, an outer side surface facing the cap plate, and a concave portion recessed from the inner side surface toward the outer side surface, the concave portion being disposed adjacent to the explosion-proof valve in a thickness direction of the cap plate, and the concave portion being used to buffer an amount of expansion and deformation of the main body; and
   an insulating plate connected to the lower insulating member and located on a side of the lower insulating member close to the electrode assembly, the insulating plate comprising a shielding segment which at least partially shields the concave portion, wherein
   the insulating plate covers the inner side surface and the concave portion of the lower insulating member from the side of the lower insulating member close to the electrode assembly;
   the concave portion comprises a first inclined surface and a second inclined surface which are distributed along the axial direction, each of the first inclined surface and the second inclined surface is inclined from the inner side surface toward the outer side surface, the explosion-proof valve is located between the first inclined surface and the second inclined surface, and the first inclined surface and the second inclined surface become close to each other in a direction from the inner side surface to the outer side surface;
   in the axial direction, a distance between a first end of the first inclined surface close to the explosion-proof valve and the explosion-proof valve is smaller than a distance between the first end of the first inclined surface close to the explosion-proof valve and one of the electrode terminals, and a distance between a second end of the first inclined surface away from the explosion-proof valve and the explosion-proof valve is smaller than a distance between the second end of the first inclined surface away from the explosion-proof valve and the one of the electrode terminals; and
   in the axial direction, a distance between a first end of the second inclined surface close to the explosion-proof valve and the explosion-proof valve is smaller than a distance between the first end of the second inclined surface close to the explosion-proof valve and an other of the electrode terminals, and a distance between a second end of the second inclined surface away from the explosion-proof valve and the explosion-proof valve is smaller than a distance between the second end of the second inclined surface away from the explosion-proof valve and the other of the electrode terminals.

2. The secondary battery according to claim 1, wherein the insulating plate comprises two connecting segments, and the two connecting segments are respectively disposed on opposite sides of the shielding segment along the axial direction, respectively, and the insulating plate is connected to the lower insulating member by the two connecting segments.

3. The secondary battery according to claim 2, further comprising a current collecting member comprising a connecting portion, wherein the cap assembly further comprises an electrode terminal connected to the cap plate, the electrode terminal is connected with the connecting portion, and the connecting segment covers a surface of the connecting portion and the electrode terminal each facing the electrode assembly.

4. The secondary battery according to claim 2, further comprising a bonding member, the bonding member being disposed between the connecting segment and the lower insulating member, the bonding member being not disposed between the shielding segment and the lower insulating member, and the connecting segment is bonded to the lower insulating member through the bonding member.

5. The secondary battery according to claim 4, wherein the bonding member has a thickness from 0.5 μm to 15 μm, and has a bonding strength greater than 0.05 N/mm².

6. The secondary battery according to claim 1, wherein the first inclined surface and the inner side surface are both flat surfaces, and an angle formed between the first inclined surface and the inner side surface is from 120° to 170°; and/or, the second inclined surface and the inner side surface are flat surfaces, and an angle formed between the second inclined surface and the inner side surface is from 120° to 170°.

7. The secondary battery according to claim 6, wherein gaps are formed between the shielding segment and the first inclined surface and between the shielding segment and the second inclined surface in the direction from the inner side surface to the outer side surface, respectively.

8. The secondary battery according to claim 7, wherein the gap has a size that gradually increases.

9. The secondary battery according to claim 6, wherein a portion of the lower insulating member corresponding to the first inclined surface has a thickness that gradually decreases in a direction approaching the explosion-proof valve; and/or, a portion of the lower insulating member corresponding to the second inclined surface has a thickness that gradually decreases in the direction approaching the explosion-proof valve.

10. The secondary battery according to claim 1, wherein the insulating plate is formed of an elastic structural body, the insulating plate has a thickness from 0.05 mm to 5 mm and has a Young's elastic modulus from 500 MPa to 10000 MPa.

11. The secondary battery according to claim 1, wherein the shielding segment has a maximum width smaller than that of the concave portion in a direction perpendicular to the axial direction; or the insulating plate comprises a through hole provided at the shielding segment, and the through hole is in communication with the concave portion.

* * * * *